United States Patent
Aschoff

(10) Patent No.: US 6,863,084 B2
(45) Date of Patent: Mar. 8, 2005

(54) FUEL TANK AND A METHOD OF MAKING SAME

(75) Inventor: Wolfgang Aschoff, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 221 days.

(21) Appl. No.: 10/286,981

(22) Filed: Nov. 4, 2002

(65) Prior Publication Data

US 2003/0102034 A1 Jun. 5, 2003

(30) Foreign Application Priority Data

Nov. 3, 2001 (DE) .......................... 101 54 150

(51) Int. Cl.⁷ ............................................. F02M 33/08
(52) U.S. Cl. .................. 137/565.22; 137/574; 123/514; 123/516
(58) Field of Search .................... 135/565.22, 574; 123/514, 516, 522, 540, 541

(56) References Cited

U.S. PATENT DOCUMENTS

| | | | | |
|---|---|---|---|---|
| 4,794,888 A | * | 1/1989 | Lang | 123/514 |
| 4,829,968 A | * | 5/1989 | Onufer | 123/518 |
| 4,969,679 A |  | 11/1990 | Eyb | |
| 5,078,169 A | * | 1/1992 | Scheurenbrand et al. | 137/574 |
| 5,396,872 A | * | 3/1995 | Ruger et al. | 123/514 |
| 5,797,377 A | * | 8/1998 | Fischerkeller | 123/514 |
| 6,089,249 A | * | 7/2000 | Thibaut et al. | 123/516 |
| 6,276,342 B1 | * | 8/2001 | Sinz et al. | 123/514 |
| 6,591,866 B2 | * | 7/2003 | Distelhoff et al. | 137/565.22 |

FOREIGN PATENT DOCUMENTS

| | | | |
|---|---|---|---|
| DE | 30 40 160 A1 | * | 6/1982 |
| DE | 3829346 | | 3/1990 |
| DE | 43 11 470 A1 | * | 10/1994 |
| DE | 19713606 | | 4/1998 |
| DE | 29809008 | | 6/1999 |
| DE | 19949261 | | 4/2001 |
| WO | WO 01/05614 | * | 1/2001 |

OTHER PUBLICATIONS

German Search Report.

* cited by examiner

*Primary Examiner*—John Rivell
(74) *Attorney, Agent, or Firm*—Crowell & Moring LLP

(57) ABSTRACT

A fuel tank, in particular for a motor vehicle having a tank venting system, comprises a sucking jet pump which feeds fuel into a sucking-jet-pump feedline which fills a storage pot arranged in the tank. The sucking jet pump has a driving nozzle. A line leads from the region of the tank roof into a negative pressure region of the sucking jet pump.

21 Claims, 1 Drawing Sheet

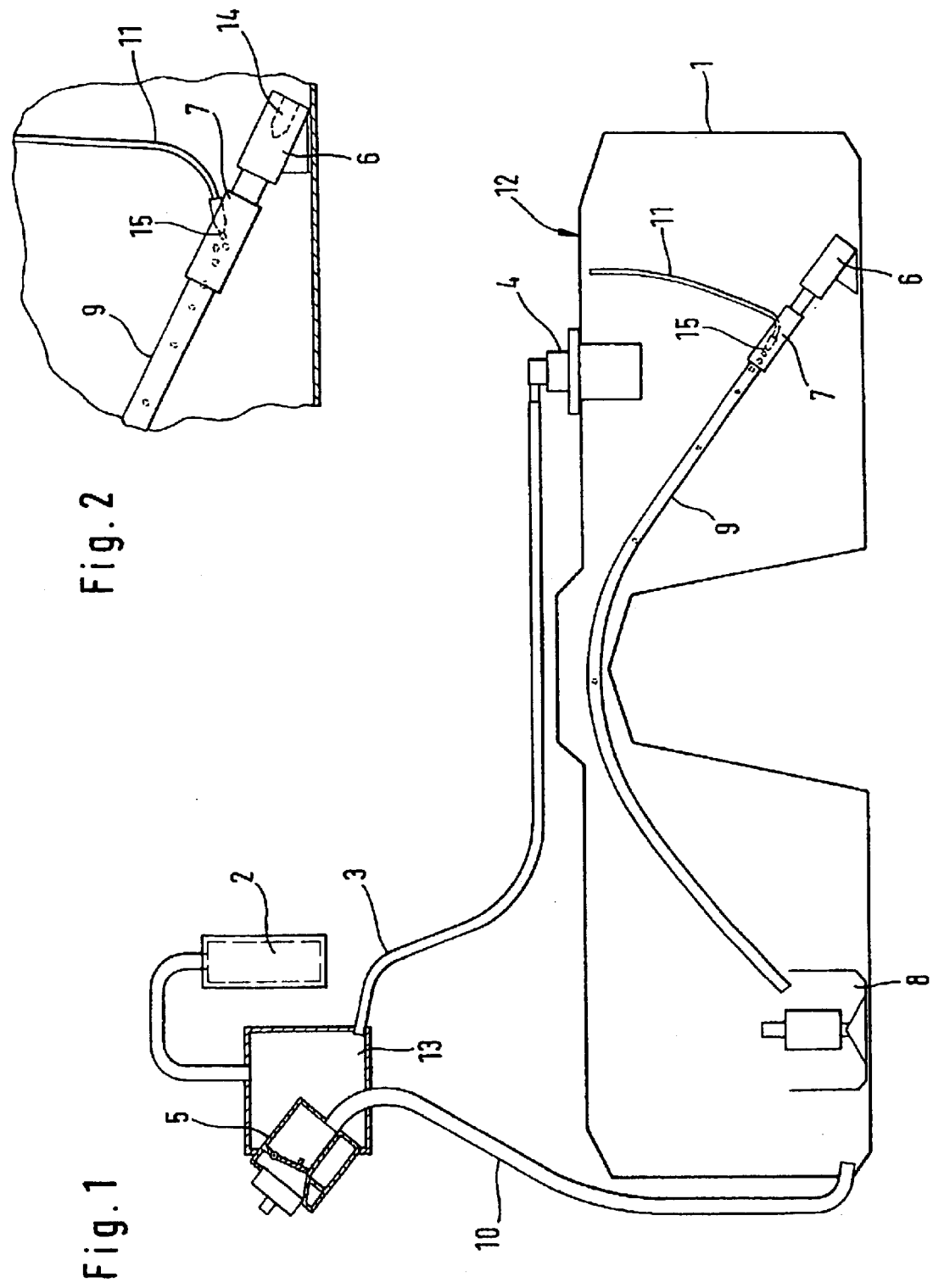

FUEL TANK AND A METHOD OF MAKING SAME

BACKGROUND AND SUMMARY OF THE INVENTION

This application claims the priority of German Patent Document 101 54 150.3, filed on Nov. 3, 2001, the disclosure of which is expressly incorporated by reference herein.

The invention relates to a fuel tank comprising a tank venting system and a sucking jet pump which feeds fuel into a sucking-jet-pump feedline which fills a storage pot arranged in the tank, the sucking jet pump having a driving nozzle.

In fuel tanks, in particular in motor vehicles, fuel constantly evaporates as a function of vapor pressure, ambient pressure, temperature and movement. In order to avoid an excessive pressure load on the fuel tank, fuel tanks have a ventilation and venting system. In order to prevent hydrocarbon emissions during the venting, a regenerating activated carbon filter which adsorbs hydrocarbons can be provided in the venting system. For regeneration purposes, the activated carbon filter has air flowing through it, and the fuel vapor/air mixture which arises is supplied to the internal combustion engine for combustion. The activated carbon filter is severely loaded by the fuel vapor. In order to relieve the activated carbon filter of load, recondensation lines are known. The latter conduct the fuel vapors which arise during refuelling back into the filler-neck head, so that they become liquid in the refuelling flow and flow together with the latter into the tank. However, this recondensation device is only active during the refuelling process.

An aspect of certain preferred embodiments of the invention is based on providing a fuel tank of the above type which enables the fuel vapors which arise to be continuously condensed.

This aspect is achieved by a fuel tank in which a line leads from a region of the tank roof into a negative pressure region of the sucking jet pump.

The line leading from the region of the tank roof into a negative pressure region of the sucking jet pump continuously sucks fuel vapor from the region of the tank roof into the fuel flow flowing through the sucking jet pump. The fuel vapor is liquefied in the process. The load on the activated carbon filter is reduced by the continuous sucking of the fuel vapors into the sucking jet pump, since the exposure of the filter to fuel vapor is minimized. The required regeneration of the activated carbon filter is thereby reduced. This is advantageous particularly in the case of directly injected spark-ignition engines, since with the latter the required regenerating rates for the activated carbon filter can no longer readily be made available.

The lower load on the activated carbon filter increases its service life. Since the risk of "bleeding emissions" is reduced by the lower loading of the activated carbon filter, fuel vapor emissions can be minimized. In addition to the active regeneration of the activated carbon filter via the regenerating system, a gradual, passive regeneration of the activated carbon filter takes place, since by way of the condensation of the hydrocarbon molecules in the tank a negative pressure is produced therein causing air to be sucked through the activated carbon filter into the tank, the air thereby regenerating the activated carbon.

Provision is made for the line to be designed as a section of hose. The production of the line is thus particularly cost-effective and simple. A mixing tube is advantageously arranged downstream of the driving nozzle. The line expediently opens into a negative pressure region in the mixing tube. Good fixing of the line is thus possible. Furthermore, a good sucking power is produced and the function of the sucking jet pump is only slightly affected. Provision is made for the line to open into the mixing tube approximately parallel to the direction of flow therein. Particularly favorable flow ratios are therefore produced in the mixing tube. However, it may be expedient for the direction of flow of a fluid emerging from the line into the mixing tube to be inclined by an angle of less than 90° with respect to the direction of flow in the mixing tube.

BRIEF DESCRIPTION OF THE DRAWINGS

FIG. 1 shows a schematic illustration of a tank venting system with a sucking jet pump, and FIG. 2 shows an enlarged schematic view of the sucking jet pump from FIG. 1.

DETAILED DESCRIPTION OF THE DRAWINGS

FIG. 1 schematically illustrates a fuel tank 1 which is designed as a saddle-type tank. The tank 1 can be filled via a filler-neck head 5 and a tank feedline 10. A shut-off valve 4 is arranged in the tank roof 12 which, when the vehicle is standing on a flat surface forms the upper side of the tank 1. Fuel vapor can escape from the tank 1 via the shut-off valve 4. The escaping fuel vapor is conducted via the tank venting line 3 into a chamber 13 assigned to the filler-neck head 5 and from there into the activated carbon filter 2. The activated carbon filter 2 adsorbs hydrocarbons from the fuel vapor, so that they cannot escape into the surroundings. For regeneration of the activated carbon filter 2, the latter has air flowing through it in the opposite direction, so that a fuel vapor/air mixture is formed which can be fed to the internal combustion engine.

Arranged in the fuel tank 1 is a sucking jet pump 6 which continuously feeds fuel via a sucking-jet-pump feedline 9 into a storage pot 8. The fuel is supplied from the storage pot 8 to the internal combustion engine.

The sucking jet pump 6 is illustrated on an enlarged scale in FIG. 2. The sucking jet pump 6 has a driving nozzle 14 from which a fuel jet emerges. The negative pressure which arises drives surrounding fuel into a mixing tube 7 which is arranged in the direction of flow of the fuel jet. The sucking-jet-pump feedline 9 is connected to the mixing tube 7. One end of a section of hose 11 having an outlet opening 15 opens into the mixing tube 7, and its other end in the region of the tank roof 12, in particular adjacent to the shut-off valve 4, has an opening to the interior of the tank 1. The section of hose 11 opens in the form of a Pitot tube into the mixing tube 7, i.e., it opens into the mixing tube 7 parallel to the direction of flow of the fuel, as illustrated in FIG. 1, or is, as illustrated in FIG. 2, inclined by an angle of less than 90° with respect to the direction of flow of the fuel. Provision is made for the outlet opening 15 to point downstream out of the section of hose. However, it may be expedient for the section of hose to open at a right angle into the mixing tube 7. The negative pressure prevailing in the mixing tube 7 causes fuel vapors to be sucked from the region of the tank roof 12 through the section of hose 11 into the mixing tube 7 from where it passes into the sucking-jet-pump feedline 9 and is liquefied. The mixing tube 7 acts as a condensation suction pump in this arrangement.

It may be expedient for the section of hose 11 to open into a negative pressure region of the sucking jet pump 6 upstream of the mixing tube 7. Direct opening of the section of hose 11 into the sucking-jet-pump feedline 9 may also be advantageous.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel tank, comprising a tank venting system and a sucking jet pump which feeds fuel into a sucking-jet-pump feedline which fills a storage pot arranged in the tank, the sucking jet pump having a driving nozzle, wherein a line leads from a region of a tank roof into a negative pressure region of the sucking-jet-pump feedline located downstream of the sucking jet pump.

2. The fuel tank according to claim 1, wherein the line is designed as a section of hose.

3. The fuel tank according to claim 1, wherein a mixing tube is arranged downstream of the driving nozzle.

4. The fuel tank according to claim 3, wherein the line opens into a negative pressure region in the mixing tube.

5. The fuel tank according to claim 4, wherein the line opens into the mixing tube approximately parallel to a direction of flow in the mixing tube.

6. The fuel tank according to claim 4, wherein a direction of flow of a fluid emerging from the line into the mixing tube is inclined by an angle of less than 90° with respect to a direction of flow in the mixing tube.

7. The fuel tank according to claim 1, wherein a shut-off valve is arranged on the tank roof of the fuel tank, and wherein an end of the line which is situated on the tank roof is adjacent to the shut-off valve.

8. The fuel tank according to claim 2, wherein a shut-off valve is arranged on the tank roof of the fuel tank, and wherein an end of the line which is situated on the tank roof is adjacent to the shut-off valve.

9. The fuel tank according to claim 3, wherein a shut-off valve is arranged on the tank roof of the fuel tank, and wherein an end of the line which is situated on the tank roof is adjacent to the shut-off valve.

10. The fuel tank according to claim 4, wherein a shut-off valve is arranged on the tank roof of the fuel tank, and wherein an end of the line which is situated on the tank roof is adjacent to the shut-off valve.

11. A method of making a fuel tank comprising making the fuel tank of claim 1.

12. A method of using a fuel tank comprising utilizing the fuel tank of claim 1.

13. A method of making a fuel tank of a vehicle, comprising:

providing a tank venting system and a sucking jet pump, connecting the jet pump to a sucking-jet-pump feedline, connecting the feedline to a storage pot arranged in the tank, arranging a driving nozzle in the jet pump, and connecting a line from a region of a tank roof into a negative pressure region of the sucking-jet pump feedline located downstream of the jet pump.

14. A fuel tank, comprising:

a tank venting system, a sucking jet pump with a feedline which is adapted to be fed fuel from the jet pump in use, the jet pump having a driving nozzle, and a line leading from a region of a tank roof which contains fuel vapor, in use, into a negative pressure region of the sucking-jet pump feedline located downstream of the jet pump.

15. The fuel tank according to claim 14, wherein the feedline operatively fills a storage pot arranged in the tank.

16. The fuel tank according to claim 14, wherein a mixing tube is arranged downstream of the driving nozzle.

17. The fuel tank according to claim 16, wherein the line opens into a negative pressure region in the mixing tube.

18. The fuel tank according to claim 17, wherein the line opens into the mixing tube approximately parallel to a direction of flow in the mixing tube.

19. The fuel tank according to claim 17, wherein a direction of flow of a fluid emerging from the line into the mixing tube is inclined by an angle of less than 90° with respect to a direction of flow in the mixing tube.

20. The fuel tank according to claim 14, wherein a shut-off valve is arranged on the tank roof of the fuel tank, and wherein an end of the line which is situated on the tank roof is adjacent to the shut-off valve.

21. A fuel tank, comprising:

a tank venting system, a sucking jet pump with a feedline which is adapted to be fed fuel from the jet pump in use, the jet pump having a driving nozzle, and a line leading from a region of a tank roof which contains fuel vapor, in use, into a negative pressure region of the jet pump or a negative pressure region downstream of said sucking-jet pump feedline located downstream of the jet pump.

* * * * *